C. H. WOLCOTT.
Hand Seeder.
No. 44,032. Patented Aug. 30, 1864.
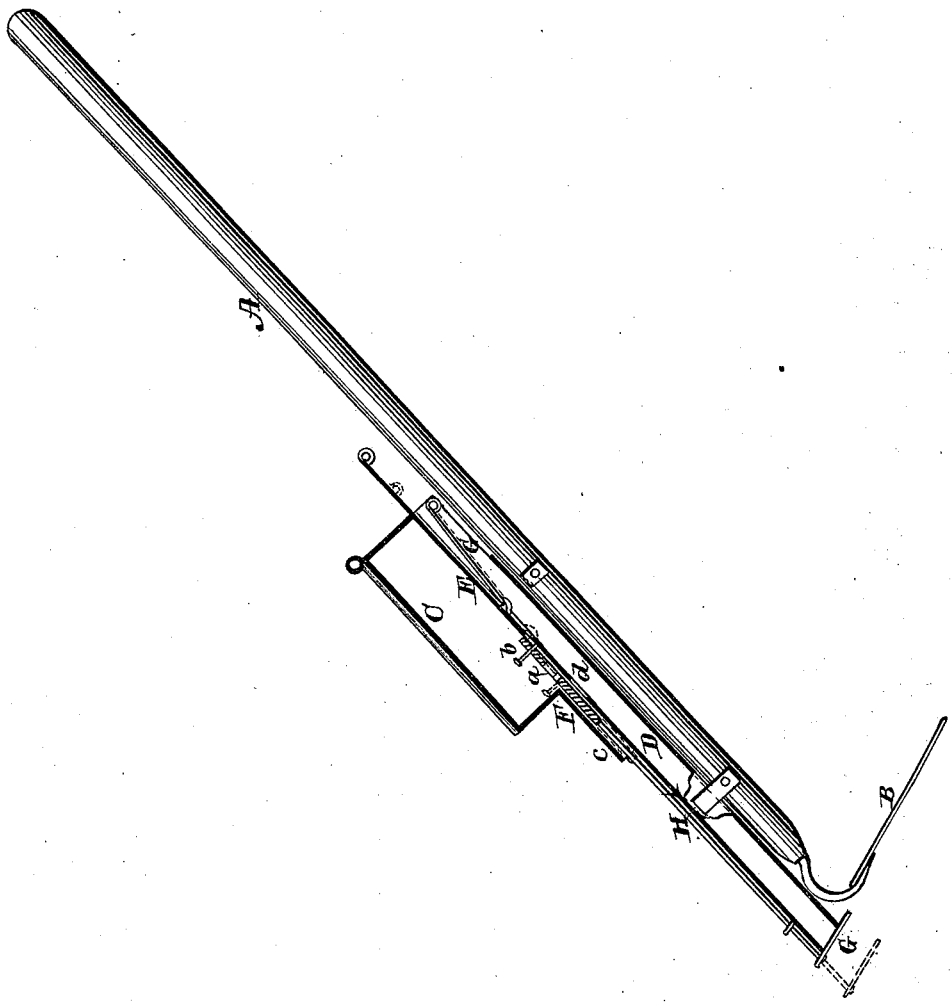
Witnesses:
Inventor:

UNITED STATES PATENT OFFICE.

CHARLES H. WOLCOTT, OF RANDOLPH, NEW YORK.

HOE AND SEED-PLANTER.

Specification forming part of Letters Patent No. 44,032, dated August 30, 1864.

*To all whom it may concern:*

Be it known that I, CHARLES H. WOLCOTT, of Randolph, in the county of Cattaraugus and State of New York, have invented a new and Improved Combination of a Hand-Hoe and Seed-Planter; and I do hereby declare that the following is a full, clear, and exact description thereof, which will enable any person skilled in the art to make and use the same, reference being had to the accompanying drawing, making a part of this specification, said drawing being a longitudinal central section of a seed-distributing device applied to a hoe, the latter not being in section.

The object of this invention is to combine a seed-distributing device with a hoe, by which the hoe may be used in the ordinary way to perform its usual work, and the seed distributed at any time, at the will of the operator, without the liability of having the seed-distributing device choked or clogged with earth, so as to prevent it from operating perfectly.

A represents a hoe-handle, and B the hoe attached thereto in the usual or in any proper way. On the handle A there is secured a rectangular box, C, which may be of sheet metal, and D is a tube which leads from said box and extends down to the top of the hoe B, the tube D extending along underneath the whole length of the box C. In the box C there is placed a slide, E, to which a wooden block, F, is attached, having a hole or seed-cell, *a*, made in it, and an upright pin, *b*, fitted in to serve as a stop, said pin being behind the hole *a*, as plainly shown in the drawing. The block F slides in a recess or chamber, *c*, in front of the box C, and over a hole, *d*, made in the top of the tube D, and an india-rubber or other spring, G, is attached to the slide, which spring has a tendency to keep the slide E drawn back and the hole or seed-cell *a* within the box C. This hole or seed-cell *a*, when in the box C, becomes filled with seed, and when the slide E is shoved down the block F enters the chamber *c*, and when the hole or seed-cell *a* comes in line with the hole *d* in the top of the tube D the seed drops into the latter and passes down to its lower end, from whence it is discharged and comes in contact with a plate, G, which scatters it properly in front of the hoe. This plate G is attached to the front end of a rod, H, which is secured to the front end of the block F, and consequently the plate G moves with the slide. When the latter is drawn back under the action of the spring G, the plate G covers the end of the tube D and prevents the admission of dirt therein. The whole arrangement is extremely simple and efficient. There are no parts liable to become deranged by use, and the hoe may be made to perform its usual work without the liability of the seed-distributing device becoming choked or clogged with earth.

I do not claim broadly the combination of a seed-distributing device and a hoe, for they have been previously used; but I do claim as new and desire to secure by Letters Patent—

The seed-distributing device composed of the box C, slide E, and tube D, when used in connection with the plate G, and all combined with a hoe to operate in the manner substantially as and for the purpose herein set forth.

CHARLES H. WOLCOTT.

Witnesses:
C. A. CHAPMAN,
FRANK C. HOVEY.